(12) United States Patent
McKinnell et al.

(10) Patent No.: US 12,544,834 B2
(45) Date of Patent: Feb. 10, 2026

(54) AGENT DROPLET DEPOSITION DENSITY DETERMINATIONS FOR POROUS ARTICLES

(71) Applicant: Peridot Print LLC, Palo Alto, CA (US)

(72) Inventors: James Charles McKinnell, Corvallis, OR (US); Carl Ricklef Reid, Vancouver, WA (US); Pavan Kumar Suri, Corvallis, OR (US); John Joseph Briden, Palo Alto, CA (US)

(73) Assignee: PERIDOT PRINT LLC, Palo Alto, CA (US)

( * ) Notice: Subject to any disclaimer, the term of this patent is extended or adjusted under 35 U.S.C. 154(b) by 13 days.

(21) Appl. No.: 18/292,815

(22) PCT Filed: Jul. 27, 2021

(86) PCT No.: PCT/US2021/043327
§ 371 (c)(1),
(2) Date: Jan. 26, 2024

(87) PCT Pub. No.: WO2023/009107
PCT Pub. Date: Feb. 2, 2023

(65) Prior Publication Data
US 2025/0001499 A1    Jan. 2, 2025

(51) Int. Cl.
*B22F 10/37* (2021.01)
*B22F 10/14* (2021.01)
(Continued)

(52) U.S. Cl.
CPC .............. *B22F 10/37* (2021.01); *B22F 10/14* (2021.01); *B22F 10/85* (2021.01); *B33Y 10/00* (2014.12); *B33Y 50/02* (2014.12); *B33Y 80/00* (2014.12)

(58) Field of Classification Search
None
See application file for complete search history.

(56) References Cited

U.S. PATENT DOCUMENTS

| 5,653,925 A * | 8/1997 | Batchelder ............ B29C 64/112 264/308 |
| 2017/0136524 A1* | 5/2017 | Ederer ...................... B22C 9/10 |
| 2018/0126649 A1 | 5/2018 | Romano et al. |

FOREIGN PATENT DOCUMENTS

| WO | WO-2017143077 A1 * | 8/2017 | .............. B22F 12/90 |
| WO | 2019/125488 A1 | 6/2019 | |

(Continued)

*Primary Examiner* — David Earl Ogg
(74) *Attorney, Agent, or Firm* — Michael Dryja (57) ABSTRACT

According to examples, a non-transitory computer-readable medium may have stored thereon instructions that may cause a processor to identify a first porosity level range that a first portion of a layer of build material particles is to have. The processor may also determine a density level at which an agent is to be deposited as droplets onto the first portion of the layer of the build material particles to cause the first portion of the layer to have a porosity that is within the identified first porosity level range. The processor may further store the determined density level, in which an article including the first portion having a porosity level that is within the identified first porosity level range is to be fabricated from the build material particles based on the determined density level.

10 Claims, 5 Drawing Sheets

(51) Int. Cl.
  *B22F 10/85*   (2021.01)
  *B33Y 10/00*   (2015.01)
  *B33Y 50/02*   (2015.01)
  *B33Y 80/00*   (2015.01)

(56) References Cited

FOREIGN PATENT DOCUMENTS

| WO | WO-2020222759 A1 * | 11/2020 | ............ B22F 12/90 |
| WO | 2020/251528 A1 | 12/2020 | |
| WO | 2020/251917 A1 | 12/2020 | |

* cited by examiner

```
IDENTIFY A FIRST POROSITY LEVEL RANGE FOR A
FIRST AREA OF AN ARTICLE
502
```

↓

```
DETERMINE A FIRST DENSITY LEVEL AT WHICH AGENT
DROPLETS ARE TO BE DEPOSITED
504
```

↓

```
STORE THE DETERMINED FIRST DENSITY LEVEL
506
```

*FIG. 5*

AGENT DROPLET DEPOSITION DENSITY DETERMINATIONS FOR POROUS ARTICLES

BACKGROUND

In three-dimensional (3D) printing, an additive printing process may be used to make 3D solid parts from a digital model. 3D printing techniques are considered additive processes because they involve the application of successive layers or volumes of a build material, such as a powder or powder-like build material, to an existing surface (or previous layer). 3D printing often includes solidification of the build material, which for some materials may be accomplished through use of heat, a chemical binder, and/or an ultra-violet or a heat-curable binder.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

The deposition of agent droplets onto a layer of build material particles, e.g., powder particles, often causes some of the build material particles upon which the droplets are deposited to be displaced. That is, the ballistic momentum caused by the droplets hitting the build material particles causes some of the build material particles to be moved from their current positions and for pores to be formed between some of the build material particles due to the movement of the build material particles. The density of droplets deposited onto the layer may affect the porosity of the layer. That is, the greater the number of droplets (or mass of droplets) per unit area, e.g., density of the droplets, the greater the porosity of the layer.

Disclosed herein are apparatuses, 3D fabrication systems, and methods in which a processor identifies a first porosity level range that a first portion of a layer of build material particles is to have and determines a density level at which an agent is to be deposited as droplets onto the first portion of the layer of the build material particles to cause the first portion of the layer to have a porosity level that is within the identified first porosity level range. In addition, an article, e.g., a porous article, including the first portion having a porosity level that is within the identified first porosity level range may be fabricated from the build material particles based on the determined density level. In some examples, the processor causes a fabrication component of a 3D fabrication system to deposit the droplets of the agent at the determined density level.

The agent droplets may be deposited onto multiple layers of build material particles in selected patterns to cause a green part having a certain configuration to be formed. A green part may be defined as a collection of build material particles that are bound or fused together in a semi-permanent manner, e.g., a state in which the collection of build material particles is in prior to undergoing additional heating for the build material particles to be sintered. In some examples, the build material particles are formed of a metallic material and the green part undergoes a sintering process to be hardened. According to examples, the sintering process includes the application of heat at a temperature and duration that causes the green part to harden into an article while the pores formed between some of the build material particles remain in the article such that the article is porous. The temperature may be anywhere from around 700° C. to around 1200° C. and the duration may be anywhere from around 60 minutes to around 120 minutes. The temperature and duration may be based on the type of the build material particles.

In some examples, the article is a filter, a screen, and/or the like, that may be employed to filter particles from fluids flowing through the article. By way of particular example, the article is a screen of a molded fiber tool that may be employed to fabricate molded fiber parts. As another example, the article may be employed in the evacuation of steam from a wet part that is thermoformed, e.g., formed through the application of heat onto the wet part through the article.

Through implementation of various features of the present disclosure, the porosity of an article fabricated through an additive manufacturing process may be controlled. Particularly, the porosity is controlled through a determination of the density level at which agent droplets are to be deposited onto layers of build material particles to achieve an intended porosity level. The build material particles may also be sintered, which may cause bonds between the build material particles to be relatively strong. As a result, articles fabricated through implementation of various features of the present disclosure may have intended porosity levels while also being of relatively high strength.

Figure 1:
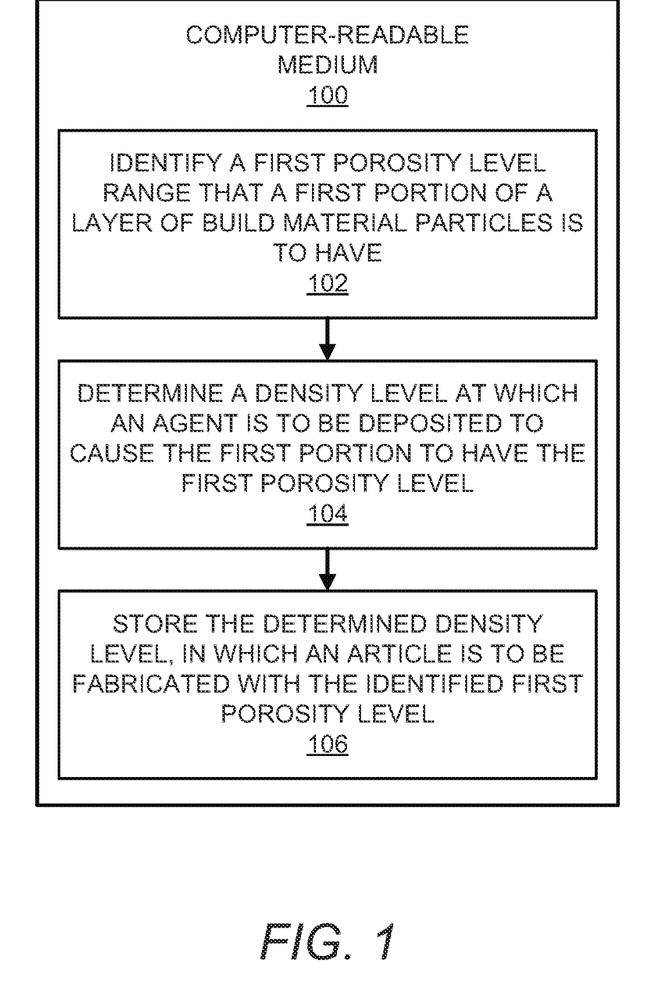
FIG. 1 shows a block diagram of an example computer-readable medium that has stored thereon computer-readable instructions for determining a density level at which an agent is to be deposited as droplets to cause a layer of build material particles to have a porosity that is within an identified first porosity level range.

Reference is first made to FIG. 1, which shows a block diagram of an example computer-readable medium 100 that has stored thereon computer-readable instructions for determining a density level at which an agent is to be deposited as droplets to cause a layer of build material particles to have a porosity that is within an identified first porosity level range. It should be understood that the example computer-readable medium 100 depicted in FIG. 1 may include additional attributes and that some of the attributes described herein may be removed and/or modified without departing from the scope of the example computer-readable medium 100.

Figure 2A:
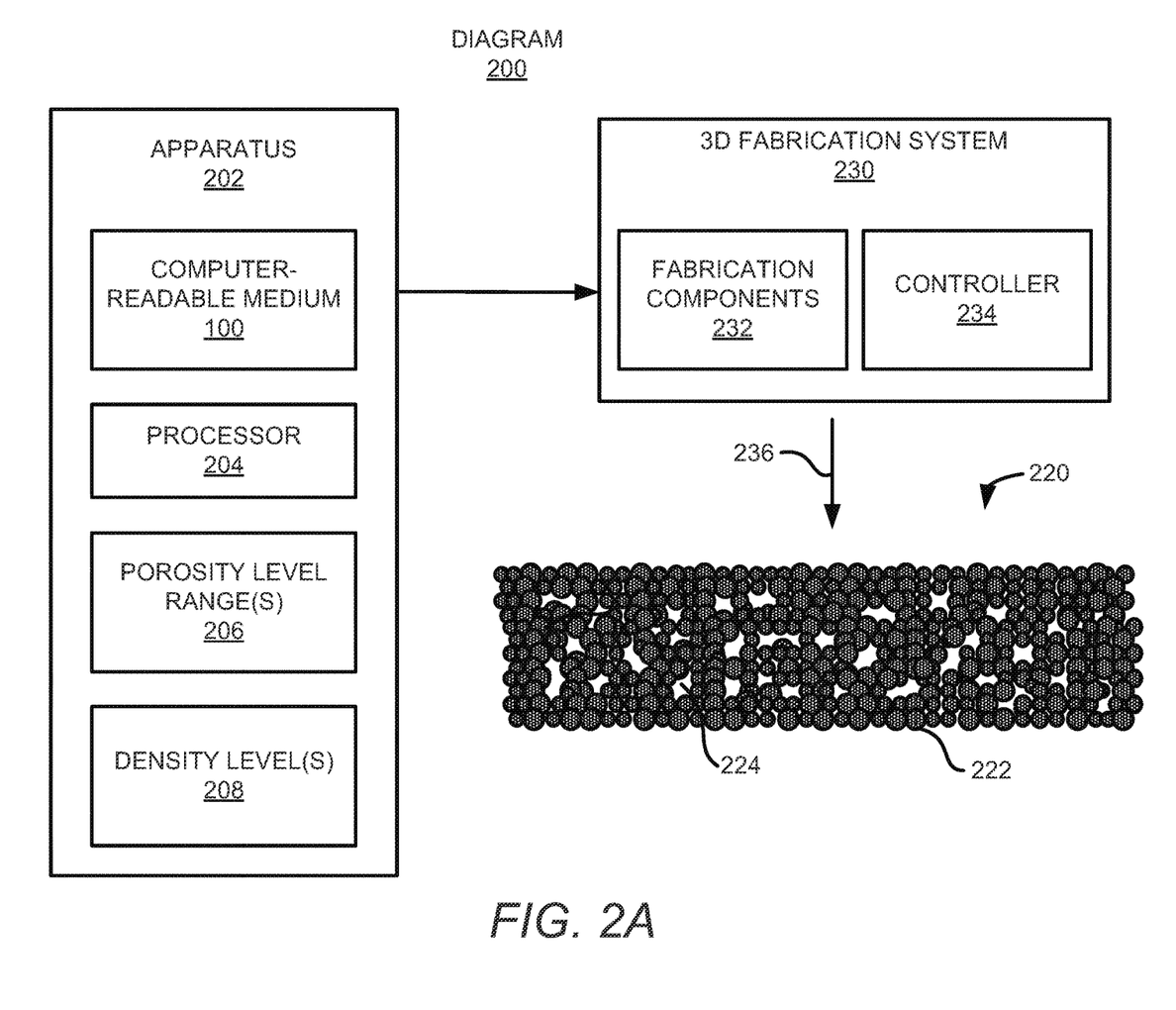
FIG. 2A shows a diagram of an example apparatus, which includes an example processor that executes the computer-readable instructions stored on the example computer-readable medium to determine the density level at which the agent is to be deposited.

The computer-readable medium 100 has stored thereon computer-readable instructions 102-106 that a processor, such as the processor 204 of the apparatus 202 depicted in FIG. 2A, is to execute. The computer-readable medium 100 is an electronic, magnetic, optical, or other physical storage device that contains or stores executable instructions. The computer-readable medium 100 is, for example, Random Access memory (RAM), an Electrically Erasable Programmable Read-Only Memory (EEPROM), a storage device, an optical disc, and the like. Generally speaking, the computer-readable medium 100 may be a non-transitory computer-readable medium, in which the term "non-transitory" does not encompass transitory propagating signals.

The processor 204 may fetch, decode, and execute the instructions 102 to identify a first porosity level range that a first portion of a layer of build material particles is to have. Various manners in which the processor 204 may identify the first porosity level range are discussed in greater detail herein with respect to FIG. 2A. The processor 204 may fetch, decode, and execute the instructions 104 to determine a density level at which the agent is to be deposited as droplets onto the first portion of the layer of the build material particles to cause the first portion of the layer to have a porosity that is within the identified first porosity level range. Various manners in which the processor 204 may determine the density level at which the agent is to be deposited the first porosity level range are discussed in greater detail herein with respect to FIG. 2A. In addition, the processor 204 may fetch, decode, and execute the instructions 106 to store the determined density level. In addition, an article including the first portion having a porosity level that is within the identified first porosity level range may be fabricated from the build material particles based on the determined density level.

By having the certain porosity level range, the article may enable fluid to flow through the article while blocking particles having sizes that are larger than a certain size from flowing through the article. In addition, fluid in gaseous form may flow through the pores in the article as may occur during evaporation of a liquid from a wet part 402 being heated during formation of the wet part 402.

Figure 2B:
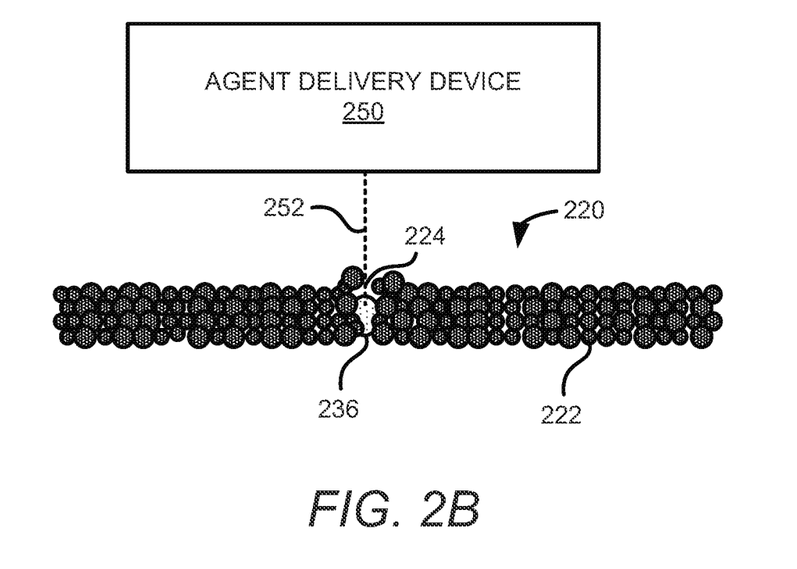
FIG. 2B depicts a cross-sectional side view of the first portion of the layer of build material particles depicted in FIG. 2A during an example deposition of an agent onto the first portion.

Reference is now made to FIGS. 2A and 2B. FIG. 2A shows a diagram 200 of an example apparatus 202, which includes an example processor 204 that may execute the computer-readable instructions stored on the example computer-readable medium 100 to determine the density level at which the agent is to be deposited. FIG. 2A also depicts a top view of an example first portion of a layer of build material particles, in which the example first portion of the layer of build material particles includes a porosity that is within an identified first porosity level as determined by the example computer-readable medium 100 depicted in FIG. 1. FIG. 2B depicts a cross-sectional side view of the first portion of the layer of build material particles depicted in FIG. 2A during deposition of an agent onto the first portion. It should be understood that the diagrams shown in FIGS. 2A and 2B may include additional attributes and that some of the attributes described herein may be removed and/or modified without departing from the scopes of the diagrams shown in FIGS. 2A and 2B.

The apparatus 202 is a computing device, such as a server, a laptop computer, a desktop computer, and/or the like. In addition or in other examples, the apparatus 202 is a 3D fabrication system, e.g., the 3D fabrication system 230 depicted in FIG. 2A, or an apparatus within a 3D fabrication system.

The processor 204 executes the instructions 102 (FIG. 1) to identify a first porosity level range 206 that a first portion 220 of a layer of build material particles 222 is to have. The processor 204 may identify the first porosity level range 206 through receipt of an instruction that indicates the first porosity level range 206. In other examples, the first porosity level range 206 is stored in a data store (not shown) and the processor 204 may retrieve the first porosity level range 206 from the data store. The first porosity level range 206 may equivalently be recited as a first permeability level range, a first pore size range, etc.

In some examples, the first porosity level range 206 is defined by the rate at which a fluid, e.g., a liquid and/or a gas, is to flow through the first portion 220 of the layer of build material particles 222. That is, for instance, the first porosity level range 206 includes a higher range of values for implementations in which a greater fluid flow is to be achieved through the first portion 220. Likewise, the first porosity level range 206 includes a lower range of values for implementations in which a lesser fluid flow is to be achieved through the first portion 220. In any of these examples, the rate, e.g., a volumetric flow rate, at which the fluid may flow through the first portion 220 may be dependent upon the ranges of pores 224, e.g., numbers and/or sizes, formed between the build material particles 222. In other words, the higher porosity level ranges may include larger numbers (and/or sizes) of pores 224 and lower porosity level ranges may include smaller numbers (and/or sizes) of pores 224.

According to examples, the particles 222 in the portion 220 of the layer of build material particles 222 are joined together, e.g., coalesced, sintered, or the like, to form part of an article (not shown). In addition, multiple layers of the build material particles 222 are joined together to form the article. The article may be any suitable type of device that may enable a fluid to flow through the article while blocking solid elements, such as debris, fiber, and/or the like, from passing through the article. In this regard, the article formed from the build material particles 222 may be a filter, a screen, a sieve, and/or the like. As discussed herein, in a particular implementation, the article is a screen for a molded fiber forming tool. In some implementations, the article is a molded fiber thermo-forming tool, which may be employed in the evacuation of steam.

According to examples, the build material particles 222 include a powder or a powder-like consistency and are formed of metallic materials. Suitable metallic materials may include stainless steel, cobalt chrome, nickel-chromium alloy, and/or the like. The build material particles 222 may further include sizes that may range between about 10 microns to about 300 microns and may depend upon the process employed to fabricate the particles 222, a type or types of material included in the particles 222, and/or the like. In other examples, the build material particles 222 may have other ranges of sizes.

In some examples, a three-dimensional (3D) fabrication system 230 is operated to cause the build material particles 222 to be selectively joined together. As shown in FIG. 2A, the 3D fabrication system 230 includes fabrication components 232 and a controller 234. The fabrication components 232 may include, for instance, a spreader (e.g., recoater) that spreads build material particles 222 into respective layers, an agent delivery device that deposits droplets of an agent 236 onto the build material particles 222 in the respective layers, an energy source device that applies heat onto the respective layers of build material particles 222 and the deposited droplets of an agent 236, and the like. In some examples, the agent 236 may be a binder agent which includes binding components, e.g., a chemical binder, and liquid components that enable the agent 236 to be jetted from the agent delivery device. The agent 236 may thus bind the build material particles 222 upon which the agent 236 has been deposited. In addition or alternatively, the agent 236 may include fusing components, e.g., materials that may enhance absorption of energy and thus increase the temperature of the build material particles 222 upon which the agent is deposited, and liquid components that enable the agent 236 to be jetted from the agent delivery device. The agent 236 may thus cause the build material particles 222 upon which the agent 236 has been deposited to fuse together. In some examples, the droplets of the agent 236 may have diameters that are around 10 microns to around 100 microns.

The agent delivery device may be a printhead, such as a thermal inkjet printhead, a piezoelectric printhead, or the like, that selectively ejects droplets of the agent 236 onto the respective layers of build material particles 222. For instance, the agent delivery device may be supported on a carriage that may move across the respective layers of build material particles 222. As the carriage is moved across a layer, the agent delivery device may selectively be activated to eject a droplet of agent 236. In this manner, the droplets of agent 236 may be deposited onto build material particles 222 positioned at selected locations of the layer to define a geometry that the joined build material particles 222 are to have. As discussed herein, the deposition of the droplets of the agent 236 causes pores 224 to be formed between some of the build material particles 222.

Following the selective deposition of the agent 236 onto a layer of build material particles 222, the energy source device may apply energy onto the layer. The energy may be in the form of heat, ultra-violet light, visible light, and/or the like. Application of the energy is to cause the liquid component in the agent 236 to evaporate, leaving the binding component in the agent 236 between the particles 222. The agent 236 is to bind the particles 222 to which the agent 236 is joined. Following repetition of this process across multiple layers, a green part is formed and the green part is removed from a build volume of the 3D fabrication system 230. In addition, excess build material particles 222, e.g., the build material particles 222 that are not intended to form part of the green part, are removed from the green part. In some examples, the build material particles 222 that have not been joined together to form the green part are recycled, e.g., used in a subsequent fabrication operation.

The green part may be moved to a sintering device (not shown), such as a dryer or oven, and may receive heat. Particularly, heat may be applied to the green part to cause the build material particles 222 to be sintered. In some examples, the temperature of the heat and the length of time at which the heat is applied onto the green part may be controlled such that the pores 224 may remain following sintering of the build material particles 222 in the green part. A finished article may be formed of the sintered build material particles 222.

The processor 204 executes the instructions 104 (FIG. 1) to determine a density level 208 at which the agent 236 is to be deposited as droplets 252 onto the first portion 220 of the layer of the build material particles 222 to cause the first portion 220 of the layer to have a porosity that is within the identified first porosity level range 206. Various manners in which the processor 204 may determine the density level 208 are discussed in greater detail herein below. The density level 208 may be defined as a number of agent droplets 252 deposited per unit area of the build material particles 222. By way of example, the density level 208 may be defined as a certain number of agent droplets 252 deposited per square millimeter. In addition or alternatively, the density level 208 may be defined as an amount, e.g., mass, of agent 236 deposited per square millimeter. By way of example, the amount of agent 236 deposited is determined through use of a measurement device (not shown) to measure the mass of the deposited agent 236. In other examples, the amount of the agent 236 deposited is determined based on an average mass of the agent droplets 252 and the number of agent droplets 252 deposited.

As shown in FIG. 2B, and as discussed elsewhere herein, an agent delivery device 250 jets droplets 252 of the agent 236 onto a layer of build material particles 222. As the droplets 252 are jetted onto the build material particles 222, some of the particles 222 are displaced due to, for instance, ballistic force applied by the droplets 252 as the droplets 252 impact some of the particles 222. The amount of displacement, or equivalently, splashing, that may occur on the build material particles 222 may be affected by the sizes (e.g., masses) of the droplets 252, the velocities at which the droplets 252 are deposited, the angles at which the droplets 252 are deposited, the sizes of the build material particles 222, the densities of the build material particles 222, the densities at which the build material particles 222 are arranged with respect to each other, and/or the like.

As also shown in FIG. 2B, a pore 224 is formed in the first portion 220 between some of the displaced particles 222. In one regard, the porosity of the first portion 220 may be affected by the density at which the droplets 252 are jetted onto the build material particles 222 in the first portion 220. That is, a larger density, e.g., a greater number of droplets 252 per unit area, a greater mass of agent 236, and/or the like, may result in the first portion 220 having a greater porosity level, while a smaller density may result in the first portion 220 having a smaller porosity level. In this regard, the porosity level of the first portion 220 may have a proportional relationship with the density level 208 at which the droplets 252 are deposited.

According to examples, correlations between density levels at which the droplets 252 of an agent 236 are deposited and the resulting porosity levels for various types of build material particles 222 are determined. The correlations may be determined through testing, prior fabrication operations, modeling, simulations, and/or the like. In addition, correlations for multiple types of agents 236, multiple sizes of droplets 252, multiple types and/or sizes of build material particles 222, and/or the like, may be determined. Moreover, the correlations may be stored in a data store, such as in a look-up table or other suitable data storage technique.

In some examples, the processor 204 determines the density level 208 at which the agent 236 is to be deposited as droplets 252 to cause the first portion 220 of the layer to have a porosity that is within the identified first porosity level range 206 from the determined correlations. For instance, the processor 204 may access data pertaining to the 3D fabrication system 230 that is to fabricate a green part from the build material particles 222. This data may include the type of build material particles 222, the type of agent 236, the sizes of the droplets of agent 236, and/or the like. The processor 204 may determine the density level 208 from a correlation corresponding to this data.

The processor 204 executes the instructions 106 (FIG. 1) to store the determined density level 208. In addition, an article including the first portion 220 having a porosity level that is within the identified first porosity level range 206 may be fabricated from the build material particles 222 based on the determined density level 208. For instance, the processor 204 may cause, e.g., control, a fabrication component 232, e.g., an agent delivery device 250, of the 3D fabrication system 230 to deposit droplets 252 of the agent 236 at the determined density level 208. In some examples, the processor 204 controls the fabrication component 232 directly while in other examples, the processor 204 sends the determined density level 208 to the controller 234 of the 3D fabrication system 230, which may be a processor, an ASIC, and/or the like. In some examples, the controller 234 controls the fabrication components 232, e.g., an agent delivery device 250, to selectively deliver droplets 252 of an agent 236 onto a layer of build material particles 222 at the determined density level 208.

Figure 3:
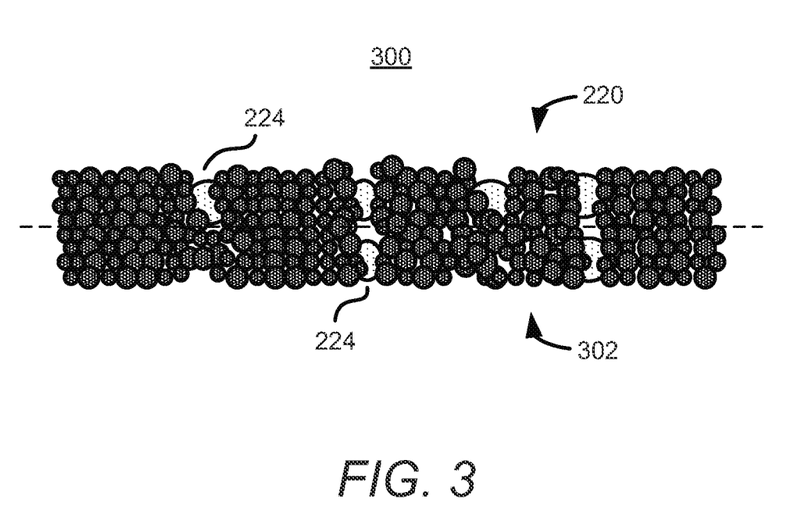
FIG. 3 depicts a cross-sectional side view of an example article formed of a first portion having a first porosity level and a second portion having a second porosity level.

Reference is now made to FIG. 3, which depicts a cross-sectional side view of an example article 300 formed of a first portion 220 having a first porosity level and a second portion 302 having a second porosity level. It should be understood that the example article 300 depicted in FIG. 3 may include additional attributes and that some of the attributes described herein may be removed and/or modified without departing from the scope of the example article 300.

A dashed line has been depicted in FIG. 3 to denote a separation between the first portion 220 and the second portion 302 of the article 300. The first portion 220 and the second portion 302 may be respective layers of build material particles 222 that are to form the article 300. For instance, the first portion 220 corresponds to an interior section of the article 300 and the second portion 302 corresponds to an exterior section of the article 300 or the first portion 220 and the second portion 302 correspond to opposite exterior sections of the article 300. In other examples, the first portion 220 and the second portion 302 correspond to different portions of the exterior section or the interior section of the article 300. For instance, the second portion 302 may be positioned laterally with respect to the first portion 220, e.g., within the same horizontal layer. In some instances, by having the multiple porosity levels, the article 300 may have improved efficiency in filtering out contaminants in fluids while lowering the risk of localized blocking. Additionally, the multiple porosity levels may enable the article 300 to achieve desired levels of filtration and strength.

In any of these examples, the second portion 302 may have a porosity level that may differ from the porosity level of the first portion 220. As shown in FIG. 3, the first portion 220 has a greater porosity level than the second portion 302. In addition, the processor 204 may determine a second density level 208 at which the agent 236 is to be deposited onto the build material particles 222 in the second portion 302 to cause the second portion 302 to have the different porosity level. Particularly, the processor 204 may identify a second porosity level range 206 that the second portion 302 of the article 300 is to have, in which the second porosity level range 206 differs from the first porosity level range 206.

The article 300 may be a 3D fabricated porous article 300 that includes a first collection of joined build material particles, e.g., first portion 220, in which a plurality of pores 224 are formed between some of the build material particles 222 at a first porosity level range through deposition of droplets 252 of an agent 236 onto respective layers of the build material particles 222 prior to the build material particles being joined together. As discussed herein, the droplets 252 of the agent 236 displace some of the build material particles 222 upon which the droplets 252 of agent 236 are deposited to form the plurality of pores 224. In addition, the droplets 252 of the agent 236 are deposited at a density level that is determined to cause the plurality of pores 224 to be formed at the first porosity level.

The 3D fabricated porous article 300 may also include a second collection of joined build material particles, e.g., second portion 302, in which the second collection of joined build material particles is joined to the first collection of joined build material particles. As shown in FIGS. 2B and 3, a plurality of pores 224 are formed between some of the build material particles at a second porosity level range through deposition of droplets 252 of the agent 236 onto respective layers of the build material particles 222 prior to the build material particles 222 being joined together. The droplets 252 of the agent 236 are deposited at a density level that is determined to cause the plurality of pores 224 to be formed at the second porosity level.

The processor 204 also determines a second density level 208 at which the agent 236 is to be deposited as droplets 252 onto the second portion 302 of the article 300 to cause the second portion to have a porosity level that is within the identified second porosity level range 206. The processor 204 may make this determination based on previously defined correlations between density levels 208 and porosity levels. The processor 204 further stores the determined second density level 208 and may cause the droplets 252 of the agent 236 to be deposited onto build material particles 222 at the determined second density level 208.

According to examples, the article 300 is a filter, a screen, a sieve, and/or the like. Thus, for instance, the pores 224 in the article 300 may follow circuitous paths through the article 300 such that a fluid may flow from one side of the article 300 to the other side of the article 300. For instance, the pores 224 may allow fluid in the form of steam to be evacuated from once side of the article 300 to the other side of the article 300. In addition or in other examples, the article 300 may block debris, fibers, and other solid particles from flowing through the article 300. The sizes of the solid particles that the article 300 may block may depend on the sizes of the pores 224 in the article 300.

Figure 4A:
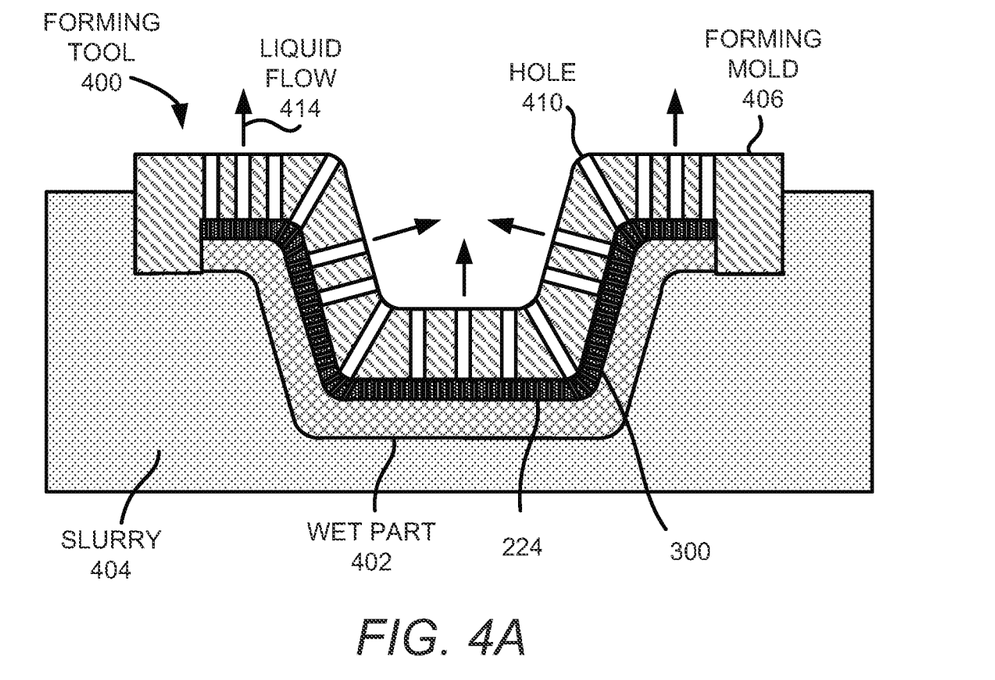
FIG. 4A shows a cross-sectional side view of the example forming tool, in which a portion of the example forming tool has been depicted as being placed within a volume of a slurry of a liquid and material elements.
Figure 4B:
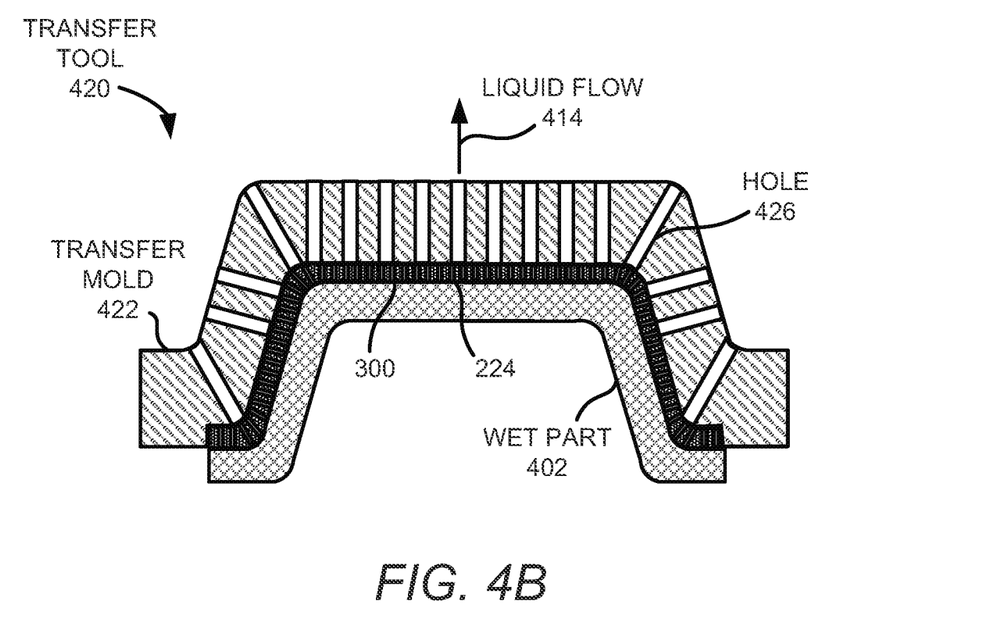
FIG. 4B shows a cross-sectional side view of the example transfer tool, which may pull a wet part from the forming tool.

By way of particular example, the article 300 is a screen for a molded fiber tool, which may be a forming tool or a transfer tool. An example of a forming tool 400 including the example article 300 is depicted in FIG. 4A and an example of a transfer tool 420 including the example article 300 is depicted in FIG. 4B. Particularly, FIG. 4A shows a cross-sectional side view of the example forming tool 400, in which a portion of the forming tool 400 has been depicted as being placed within a volume of a slurry 404 of a liquid and material elements. In some examples, the liquid may be water or another type of suitable liquid in which pulp material, e.g., paper, wood, fiber crops, bamboo, or the like, may be mixed into the slurry 404. The material elements may be, for instance, fibers of the pulp material. FIG. 4B shows a cross-sectional side view of the example transfer tool 420, which may pull a wet part 402 from the forming tool 400. The forming tool 400 and the transfer tool 420 may collectively form a molded fiber tool set.

As shown in FIG. 4A, the forming tool 400 includes a forming mold 406 and an article 300, in which the article 300 overlays the forming mold 406. As shown in FIG. 4B, the transfer tool 420 includes a transfer mold 422 and an article 300. As discussed herein, a 3D fabrication system 230 may fabricate the articles 300. In some examples, the 3D fabrication system 230 also fabricates the forming mold 406 and the transfer mold 406.

In some examples, the forming mold 406 and/or the transfer mold 422 may be removably mounted onto respective supporting structures (not shown) such that, for instance, the forming mold 406 may be moved independently from the transfer mold 422. Moreover, the forming mold 406 and the article 300 may be fabricated to have shapes to which the wet part 402 may be molded when formed on the article 300. Likewise, the transfer mold 422 and the article 300 may be fabricated to have shapes that may engage multiple surfaces of the wet part 402 formed on the forming tool 400. The article 300 in the transfer tool 420 may have a shape that is complementary to, e.g., a shape that matches, the shape of the article 300 in the forming tool 420.

As shown, the forming mold 406 and the transfer mold 422 may be formed to have relatively larger thicknesses than the article 300. The larger thicknesses of the forming mold 406 and the transfer mold 422 may cause the forming mold 406 and the transfer mold 422 to be substantially more rigid than the articles 300. The forming mold 406 and the transfer mold 422 may provide structural support for the respective articles 300. In other examples in which the articles 300 are fabricated with sufficient strength for the wet part 402 to be formed on the articles 300, the forming mold 406 and/or the transfer mold 422 may be omitted.

In some examples, and as shown in FIGS. 4A and 4B, the forming mold 406 and the transfer mold 422 include holes 410, 426 through which suction pressure may be applied. During use, liquid from the slurry 404 is suctioned through the forming tool 400 as denoted by the arrow 414. As the liquid 414 is suctioned, the article 300 in the forming tool 400 prevents the material elements in the slurry 404 from flowing through the pores 224 in the article 300. That is, the pores 224 have sufficiently small dimensions, e.g., diameters or widths, that may enable the liquid to flow through the pores 224 while blocking the material elements from flowing through the pores 224. In one regard, the diameters or widths of the pores 224 are sized based on sizes of the material elements, e.g., fibers, in the slurry 404. By way of particular example, the pores 224 may have diameters of between around 5 microns and around 500 microns. The pores 224 in the article 300 in the transfer tool 420 may have similar diameters. However, in some instances, the pores 224 may have irregular shapes as may occur during 3D fabrication processes. The pores 224 may be formed through control of the density at which an agent 236 is deposited onto build material particles 222 as discussed herein. That is, for instance, the porosity levels may directly correspond to the pores 224 in the article 300, which may be a screen in the forming tool 400 or a transfer tool 420.

Over a period of time, which may be a relatively short period of time, e.g., about a few seconds, less than about a minute, less than about five minutes, or the like, the material elements may build up on the article 300 in the forming tool 400. Particularly, the material elements in the slurry 404 are accumulated and compressed onto the article 300 into the wet part 402, in which the wet part 402 takes the shape of the article 300. In addition, the thickness and density of the wet part 402 may be affected by the types and/or sizes of the material elements in the slurry 404, the length of time that the vacuum pressure is applied while the forming tool 400 is placed within the volume of the slurry 404, etc. That is, for instance, the longer that the vacuum pressure is applied while the forming tool 400 is partially immersed in the slurry 404, the greater the thickness of the wet part 402.

After a predefined period of time, e.g., after the wet part 402 having desired properties has been formed on the article 300, the forming tool 400 may be removed from the volume of slurry 404. For instance, the forming tool 400 may be mounted to a movable mechanism that may move away from the volume of slurry 404. In some examples, the movable mechanism may rotate with respect to the volume such that rotation of the movable mechanism may cause the forming tool 400 to be removed from the volume of slurry 404. In other examples, the movable mechanism may be moved laterally with respect to the volume of slurry 404. As the forming tool 400 is removed from the volume, some of the excess slurry 404 may come off of the wet part 402. However, the wet part 402 may have a relatively high concentration of liquid.

Following the formation of the wet part 402 on the forming tool 400 and movement of the forming tool 400 out of the volume of slurry 404, the transfer tool 420 may be moved such that the article 300 in the transfer tool 420 contacts the wet part 402 on the forming tool 400. That is, for instance, the transfer mold 422 may be attached to a movable mechanism (not shown), in which the movable mechanism is to cause the transfer tool 420 to move toward the forming tool 400. In some examples, the transfer tool 420 may be moved to cause the article 300 in the transfer tool 420 to be in contact with the wet part 402 and to cause the transfer tool 420 to apply pressure onto the wet part 402 to dewater the wet part 402 while the wet part 402 is on the forming tool 400, e.g., within a second or within a few seconds of the wet part 402 being removed from the volume of slurry 404. The transfer tool 420 may continue to apply pressure onto the wet part 402 for a predefined length of time, e.g., an amount of time that may result in a certain, e.g., maximum, amount of liquid being removed from the wet part 402. In some examples, the liquid that is removed from the wet part 402 during this dewatering process may be suctioned through the pores 224 and the holes 410 in the forming tool 400.

In addition, the transfer tool 420 may be in communication with a plenum to which a vacuum source is connected such that the vacuum source may apply a vacuum pressure through the holes 426 and the pores 224 while the wet part 402 is in contact with the article 300 in the transfer tool 420. Following a predefined length of time, the vacuum pressure applied through the forming tool 400 is terminated or reversed (e.g., applied in the opposite direction) while vacuum pressure may be applied through the transfer tool 420 to facilitate transfer of the wet part 402 from the forming tool 400 to the transfer tool 420. The transfer tool 420 may also transfer the wet part 402 to a dryer or oven for further drying of the wet part 402.

In some examples, the forming tool 400 and/or the transfer tool 420 may be part of a molded fiber thermoforming tool set. In these examples, the forming tool 400 and/or the transfer tool 420 are connected to a heating source that may cause the forming tool 400 and/or the transfer tool 420 to be heated. For instance, the forming tool 400 and/or the transfer tool 420 may be heated while the wet part 402 is held between the forming tool 400 and the transfer tool 420 to heat the wet part 402 and cause the liquid in the wet part 402 to evaporate. In these examples, the evaporated liquid, e.g., gas or vapor, emitted from the wet part 402 may be evacuated through the pores 224 in the forming tool 400 and/or the transfer tool 420.

Figure 5:
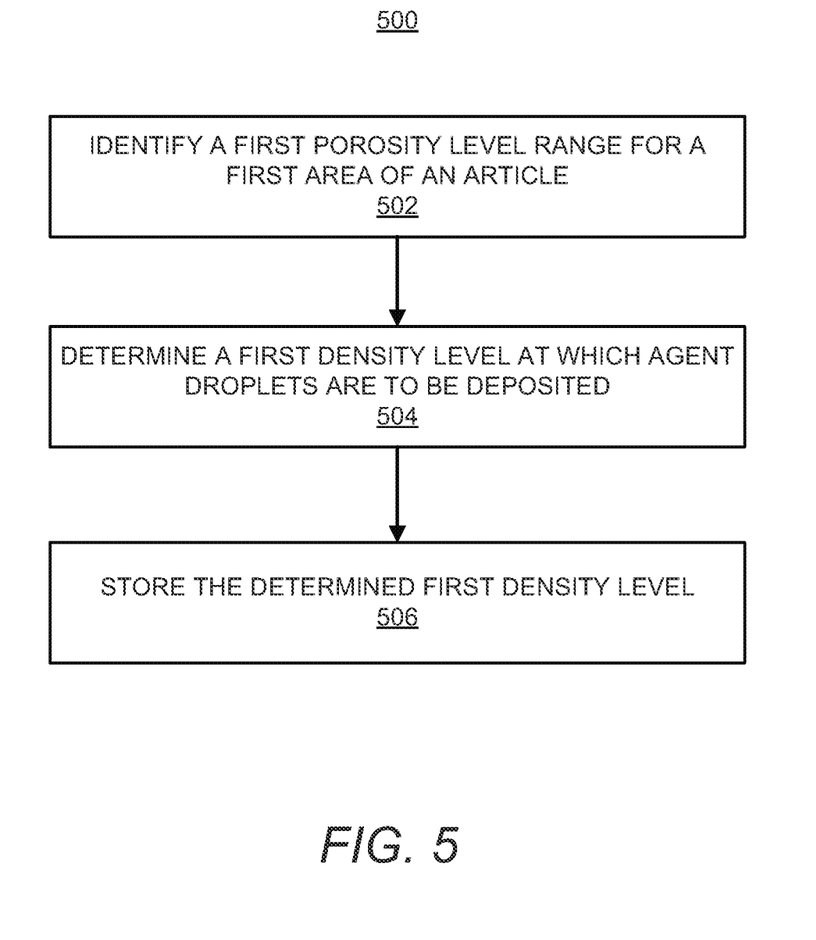
FIG. 5 shows a flow diagram of an example method for determining a first density level at which agent droplets are to be deposited to cause a first area of an article to have a porosity level that is within a first porosity level range.

Turning now to FIG. 5, there is shown a flow diagram of an example method 500 for determining a first density level 208 at which agent droplets 252 are to be deposited to cause a first area of an article 300 to have a porosity level that is within a first porosity level range 206. It should be understood that the method 500 depicted in FIG. 5 may include additional operations and that some of the operations described therein may be removed and/or modified without departing from the scope of the method 500. The description of the method 500 is also made with reference to the features depicted in FIGS. 1-3 for purposes of illustration. In some examples, the processor 204 depicted in FIG. 2 may execute some or all of the operations included in the method 500.

At block 502, the processor 204 identifies a first porosity level range 206 for a first area of an article 300 formed of build material particles 222. At block, 504, the processor 204 determines a first density level 208 at which an agent 236 is to be deposited as droplets 252 onto a first portion 220 of the build material particles 222 corresponding to the first area of the article 300. As discussed herein, deposition of the droplets 252 at the first density level 208 may cause the first area of the article 300 to have a porosity level that is within the first porosity level range 206 following sintering of the build material particles 222. At block 506, the processor 204 stores the determined first density level 208.

According to examples, the processor 204 determines correlations between density levels 208 at which the agent 236 is deposited onto build material particles 222 and resulting porosity levels. In addition, the processor 204 stores the determined correlations and may determine the first density level from the determined correlations.

As discussed herein, a 3D fabrication system 230 fabricates the article 300 using agent droplets 252 deposited at the determined first density level 208. In some examples, the processor 204 causes a fabrication component 232, e.g., an agent delivery device 250, of a 3D fabrication system 230 to deposit the droplets 252 of the agent 236 onto a layer of build material particles 222 at the determined first density level 208. Multiple areas of build material particles 222 may be joined together in this manner to form a green part of the article 300. In addition, the green part may be removed from the 3D fabrication system 230 and placed in an oven within which heat may be applied onto the green part to cause the build material particles 222 to at least partially sinter. In some examples, the heat is applied at a temperature and for a duration of time that causes the article 300 to have a porosity level that is within the first porosity level range 206. The temperature and the duration of time is determined through testing, data from prior fabrication operations, simulations, modeling, and/or the like.

According to examples in which multiple areas of the article 300 are to have multiple porosity levels, the processor 204 identifies a second porosity level range 206 for a second area of the article 300. The second porosity level range 206 may differ from the first porosity level range 206. In these examples, the processor 204 determines a second density level 208 at which the agent 236 is to be deposited as droplets 252 onto a second portion 302 corresponding to the second area of the article 300 to cause the second portion 302 to have a porosity level that is within the identified second porosity level range 206.

Some or all of the operations set forth in the method 500 may be contained as utilities, programs, or subprograms, in any desired computer accessible medium. In addition, the method 500 may be embodied by computer programs, which may exist in a variety of forms. For example, the method 500 may exist as computer-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method comprising:
identifying, by a processor, a first porosity level range for a first area of an article formed of build material particles;
determining, by the processor, a first density level at which an agent is to be deposited as droplets onto a first portion of the build material particles corresponding to the first area of the article, wherein the first density level is to cause the first area of the article to have a porosity level that is within the first porosity level range following sintering of the build material particles;
storing, by the processor, the determined first density level, wherein the article is to be fabricated using agent droplets deposited at the determined first density level; and
controlling a fabrication component of a three-dimensional (3D) fabrication system to deposit the droplets of the agent onto a layer of build material particles at the determined first density level.

2. The method of claim 1, further comprising:
identifying a second porosity level range for a second area of the article, wherein the second porosity level range differs from the first porosity level range; and
determining a second density level at which the agent is to be deposited as droplets onto a second portion corresponding to the second area of the article to cause the second portion to have a porosity level that is within the identified second porosity level range.

3. The method of claim 1, further comprising:
determining correlations between density levels at which the agent is deposited onto build material particles and resulting porosity levels;
storing the determined correlations; and determining the first density level from the determined correlations.

4. The method of claim 1, further comprising:
controlling a sintering device to apply heat to the build material particles at a temperature and duration to cause the build material particles to be set with respect to each other while the article is formed to have a porosity level that is within the first porosity level range.

5. A method comprising:
identifying, by a processor, a first porosity level range for a first area of an article formed of build material particles;
determining, by the processor, a first density level at which an agent is to be deposited as droplets onto a first portion of the build material particles corresponding to the first area of the article, wherein the first density level is to cause the first area of the article to have a porosity level that is within the first porosity level range following sintering of the build material particles; and
storing, by the processor, the determined first density level, wherein the article is to be fabricated using agent droplets deposited at the determined first density level; and
controlling a sintering device to apply heat to the build material particles at a temperature and duration to cause the build material particles to be set with respect to each other while the article is formed to have a porosity level that is within the first porosity level range.

6. The method of claim 5, further comprising:
identifying a second porosity level range for a second area of the article, wherein the second porosity level range differs from the first porosity level range; and
determining a second density level at which the agent is to be deposited as droplets onto a second portion corresponding to the second area of the article to cause the second portion to have a porosity level that is within the identified second porosity level range.

7. The method of claim 5, further comprising:
determining correlations between density levels at which the agent is deposited onto build material particles and resulting porosity levels;
storing the determined correlations; and
determining the first density level from the determined correlations.

8. A non-transitory computer-readable data storage medium storing program code executable by a processor to perform processing comprising:
identifying a first porosity level range for a first area of an article formed of build material particles;
determining a first density level at which an agent is to be deposited as droplets onto a first portion of the build material particles corresponding to the first area of the article, wherein the first density level is to cause the first area of the article to have a porosity level that is within the first porosity level range following sintering of the build material particles; and
storing the determined first density level, wherein the article is to be fabricated using agent droplets deposited at the determined first density level;
controlling a fabrication component of a three-dimensional (3D) fabrication system to deposit the droplets of the agent onto a layer of build material particles at the determined first density level; and
controlling a sintering device to apply heat to the build material particles at a temperature and duration to cause the build material particles to be set with respect to each other while the article is formed to have a porosity level that is within the first porosity level range.

9. The non-transitory computer-readable data storage medium of claim 8, wherein the processing further comprises:
identifying a second porosity level range for a second area of the article, wherein the second porosity level range differs from the first porosity level range; and
determining a second density level at which the agent is to be deposited as droplets onto a second portion corresponding to the second area of the article to cause the second portion to have a porosity level that is within the identified second porosity level range.

10. The non-transitory computer-readable data storage medium of claim 8, wherein the processing further comprises:
determining correlations between density levels at which the agent is deposited onto build material particles and resulting porosity levels;
storing the determined correlations; and
determining the first density level from the determined correlations.

* * * * *